United States Patent [19]
Takahashi

[11] Patent Number: 5,278,667
[45] Date of Patent: Jan. 11, 1994

[54] MULTIPLE VALVE IMAGE INPUT DEVICE
[75] Inventor: Hirota Takahashi, Saitama, Japan
[73] Assignee: Fuji Xerox Co., Ltd., Tokyo, Japan
[21] Appl. No.: 596,539
[22] Filed: Oct. 12, 1990
[30] Foreign Application Priority Data
  Dec. 28, 1989 [JP] Japan .................................. 1-341752
[51] Int. Cl.$^5$ .............................................. H04N 1/40
[52] U.S. Cl. .................... 358/445; 358/455; 358/458
[58] Field of Search ............. 358/445, 447, 448, 455, 358/458, 400, 401, 406, 428

[56] References Cited
U.S. PATENT DOCUMENTS
  4,962,433 10/1990 Matsushima ..................... 358/455
  4,999,711  3/1991 Paulin ............................... 358/455
  5,075,788 12/1991 Funada .............................. 358/458

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A multiple value image input device receives image data expressed in multiple chromatic gradation levels from an outside source and converts the data into digital form. The multiple value image input device corrects the image data by dividing the data into units of data, and determining the maximum and minimum gradation levels within each unit. The data within the unit is assigned new gradation levels utilizing the full range of available gradation levels. The minimum gradation level within the unit is assigned a new relatively low gradation level, and the maximum gradation level within the unit data is assigned a new relatively high gradation level. The gradations levels between the maximum and minimum values within the unit of data are assigned new interpolated gradation levels based upon the relatively low and relatively high gradation levels.

23 Claims, 7 Drawing Sheets

MULTIPLE VALVE IMAGE INPUT DEVICE

BACKGROUND OF THE INVENTION

1. Field Of The Invention

The present invention relates to a multiple value image input device which receives picture images in multiple chromatic grades or tonal ranges. The invention particularly relates to a multiple value image input device able to render the varying shades of picture images in clear definition.

2. Discussion Of The Related Art

Picture image processing with a computer system is now used extensively. Most presently known picture image input devices convert the input picture images into binary signals. The input data can be received from a scanner, a facsimile machine, a computer or some other device. A typical known image input device is the picture image input block in the conventional facsimile machine. However, the block image data processing method cannot reproduce halftone images even if it can reproduce characters and line drawings. Halftone recording processes such as the "Dither Process" have been developed, and multiple value picture image input devices, which are capable of performing the input of picture image data in multiple values, are used extensively.

In the known picture image input device, shading correction is applied to the picture image data obtained with the image input device. Specifically, the levels of the signals output by the pixels are not in complete agreement. Even if an identical part of an original sheet with the same degree of optical density is read, various factors such as non-uniformity in the sensitivity of the individual pixels comprising the one-dimensional image sensor and non-uniformity in the quantity of light on the lines of the original sheet will create inconsistent readings.

To correct inconsistent readings, a known image input device is provided with a plate with a white color (the density indicating block) arranged in the main scanning direction of a one-dimensional image sensor outside the original sheet reading area. The one-dimensional image sensor reads the white plate before reading an original sheet. The signal level is then adjusted so that the value read by each of the individual pixels will be in agreement for the level of the white color.

Thus, the conventional multiple value image input device performs density correction in picture images with reference to a white plate arranged in the main scanning direction of the one-dimensional image sensor. However, this process cannot provide a satisfactory range of chromatic grades. If an original sheet showing a human face portrayed on a large scale is read by a multiple value image input device which can reproduce many chromatic grades, such as 64 chromatic grades, the conventional process will reproduce the area of the facial skin in monotonous expression. The conventional process will only use a narrow range of the available chromatic grades to express the face. It is then difficult to recognize the facial expression and the characteristic features of a face reproduced by the known process as compared with direct observation of the original sheet. The same problem is also found with a photograph taken in twilight without a flash lamp, a landscape veiled in a thick morning mist, or an old original sheet with faded color.

SUMMARY OF THE INVENTION

An object of the present invention is to provide a multiple value image input device which clearly expresses density differences in copies.

Another object of the invention is to fully utilize the full chromatic range of an image processor.

A further object of the present invention is to provide clearly defined reproductions of original sheets having a relatively narrow density range.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above objects a method for correcting image data represented by image pixels expressed in gradation levels is provided. The method comprises the steps of dividing the image data into at least one unit of data, the at least one unit of data comprised of image pixels; detecting the maximum gradation level and the minimum gradation level in a unit of data; and assigning a new gradation level to at least one pixel in the unit of data, the new gradation level being outside the range between the detected maximum gradation level and the detected minimum gradation level for the unit of data.

According to a second aspect of the invention a method for correcting image data represented by image pixels expressed in gradation levels is provided. The method comprises the steps of dividing the image data into at least one unit of data, the at least one unit of data comprised of image pixels; detecting the maximum gradation level and the minimum gradation level in a unit of data; and calculating a new gradation level for each pixel in the unit of data. The step of calculating comprises the sub steps of assigning each pixel with the maximum gradation level a new gradation level higher than the maximum gradation level; assigning each pixel with the minimum gradation level a new gradation level lower than the minimum gradation level; and performing an interpolation to assign each pixel having a gradation level other than the maximum gradation level and the minimum gradation level a new gradation level between the new gradation level assigned to the pixels having the maximum gradation level and the new gradation level assigned to the pixels having the minimum gradation level.

BRIEF DESCRIPTION OF THE DRAWINGS

The accompanying drawings, which are incorporated in and constitute a part of this specification illustrate embodiments of the invention and, together with the description, serve to explain the principles of the invention. In the drawings.

DETAILED DESCRIPTION OF THE PREFERRED EMBODIMENTS

Figure 1:
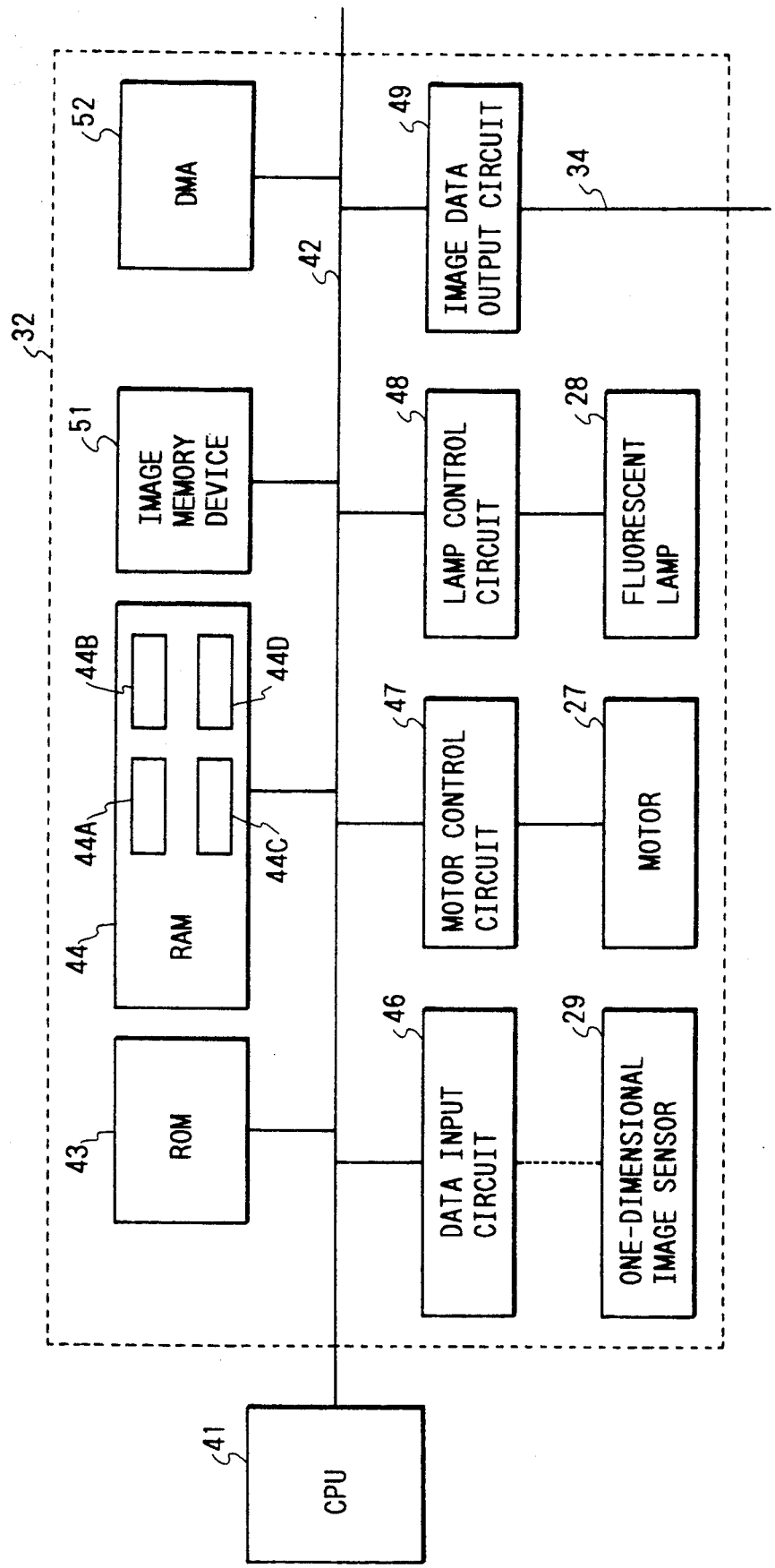
FIG. 1 is a block diagram illustrating a circuit construction for a multiple value image input device according to the first preferred embodiment of the present invention.

A multiple value image input device according to a first aspect of the invention is provided with a one-dimensional image sensor comprised of many pixels for photoelectric conversion. An analog-digital converter converts the entire range of analog signals output as picture image data from the one-dimensional image sensor into digital signals representing the division of the entire range into a prescribed number, and an image memory device stores the picture image data converted into digital signals. Maximum and minimum value detectors detect the maximum value and the minimum value for the picture image data stored in the image memory device. A density corrector corrects the density levels of the image data stored in the image memory device so that the maximum value and the minimum value detected by the maximum and minimum value detectors will be set in respective correspondence to a relatively large prescribed chromatic grade and a relatively small prescribed chromatic grade.

A virtual extension of the density range of the original sheet is achieved by storing the picture image data on the original sheet in the image memory device, finding the maximum value and the minimum value of the picture image data, and correcting the density levels of the picture image data so that the maximum value and the minimum value are set in respective correspondence to a relatively large prescribed chromatic grade and a relatively small prescribed chromatic grade.

A multiple value image input device according to a second aspect of the invention is provided with a one-dimensional image sensor comprised of many pixels for photoelectric conversion. An analog-digital converter converts the entire range of analog signals output as picture image data from the one-dimensional image sensor into digital signals representing the division of the entire range into a prescribed number. Maximum and minimum value detectors prescan the entire area of original sheet with a the normal resolution and with a degree of resolution lower than the normal resolution to detect the maximum value and the minimum value of the picture image data output from the analog-digital converter. A density corrector scans the original sheet line by line, and corrects the density levels of the picture image data output from the analog-digital converter so that the maximum value and the minimum value detected by the maximum and minimum value detector are set in respective correspondence to a relatively large prescribed chromatic grade and a relatively small prescribed chromatic grade.

Because the multiple value image input device according to the second aspect of the invention prescans the original sheet, an image memory device is not required. A virtual extension of the density range of the original sheet is achieved by finding the maximum and minimum values of the picture image data through prescanning, and correcting the density level of the picture image data so that the maximum and minimum values are set in respective correspondence to a relatively large prescribed chromatic grade and a relatively small prescribed chromatic grade.

A multiple value image input device according to a third aspect of the invention is provided a one-dimensional image sensor comprised of many pixels for photoelectric conversion. An analog-digital converter converts the entire range of analog signals output as picture image data from the one-dimensional image sensor into digital signals representing the division of the entire range into a prescribed number. A line memory device stores the picture image data converted into digital signals each time the device reads one line on the original sheet. Maximum and minimum value detectors detect the maximum value and the minimum value in the picture image data stored in line memory device. A density corrector corrects the density levels of the picture image data stored in the line memory device, so that the maximum value and the minimum value detected by the maximum and minimum value detector are set in respective correspondence to a relatively large prescribed chromatic grade and a relatively small prescribed chromatic grade.

According to the third aspect of the invention, a virtual extension of the density range of the original sheet is achieved by finding the maximum value and the minimum value for each scanned line as a unit, and correcting the density levels of the picture image data for each line unit so that the maximum value and the minimum value are set in respective correspondence to a relatively large prescribed chromatic grade and a relatively small prescribed chromatic grade.

Reference will now be made in detail to the construction of the present invention as illustrated in the accompanying drawings, in which like reference characters designate like or corresponding parts throughout the several drawings.

Figure 2:
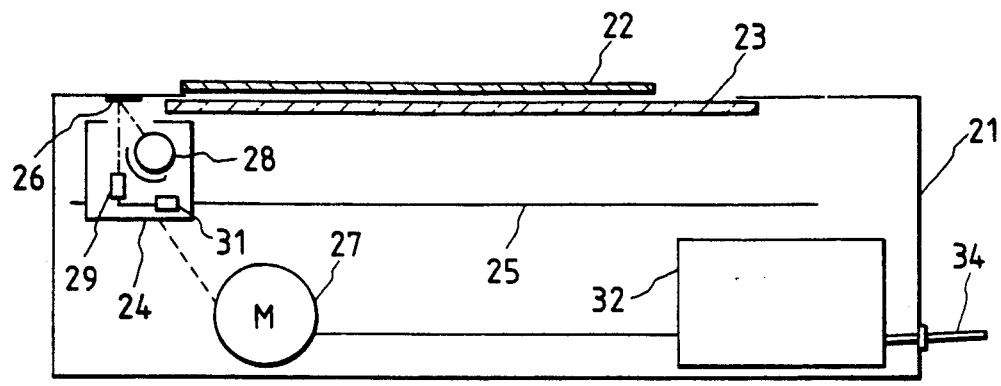
FIG. 2 is a partially schematic, partially cross-sectional illustration of the multiple value image input device according to the first preferred embodiment of the present invention.

FIG. 2 illustrates a schematic construction of a multiple value image input device 21 according to a first embodiment of the present invention.

The multiple value image input device 21 has a platen glass 23 on the upper area of the main unit in a box shape on which an original sheet 22 is set. A scanner 24 and a guide rail 25 are arranged in the inside of the main unit. The guide rail 25 guides the movement of the scanner 24 in forward and reverse directions. A density reference plate 26 is arranged over the entire width of the platen glass 23. A motor, which is installed on bottom area of the main unit of the device, provides the power for the reciprocating movement of the scanner 24.

A fluorescent lamp 28, in the scanner 24, projects a beam of light onto the original sheet 22 and a one-dimensional image sensor 29. The image sensor 29 performs photoelectric conversion of the rays reflected from the original sheet 22.

Video signals from the one-dimensional image sensor 29, in synchronization with a clock signal, are amplified by a video amplifier 31, and fed into an electronic circuit block 32. The chromatic gradation of the video signals is corrected, and the video signals are then fed out by way of a cable 34 to an image editing device not illustrated in the Figure. The electronic circuit block 32 also performs ordinary circuit operations such as driving the motor 27 and controlling the one-dimensional image sensor 29.

FIG. 1 illustrates the principal parts of the circuit construction of the multiple value image input device according to the first embodiment.

The electronic circuit is equipped with the electronic circuit block 32 and a central processing unit (CPU) 41. A bus 42, preferable a data bus, connects the CPU 41 to each of the other elements of the circuit described below.

A read only memory device ROM 43 stores programs which execute various control operations for the multiple value image input device.

A random access memory RAM 44 is connected to the CPU 41. The RAM 44 is divided into several sections. An actually measured value storage area 44A stores the actually measured values for the individual pixels read from the density reference plate 26 (shown in FIG. 2). A first-stage correction amount storage area 44B is provided in the RAM 44. A maximum and minimum value storage area 44C stores the maximum value and the minimum value of picture image data on the original sheet. A corrected data storage area 44D stores the corrected multiple value picture image data.

A data input circuit 46 is connected to the CPU 41. The data input circuit 46 receives the signals from the one-dimensional image sensor 29 amplified by the video amplifier 31, converts the amplified signals into multiple value picture image data, and transmits the data to the bus 42.

A motor control circuit 47 is connected to the CPU 41. The motor control circuit 47 controls a motor 27 to move the scanner 24 to scan the density reference plate 26. The motor control circuit 47 also controls scanning the original sheet 22 with the scanner 24, and returning the scanner 24 to its home position.

A lamp control circuit 48 is connected to the CPU 41. The lamp control circuit 48 turns on the fluorescent lamp 28.

An image data output circuit 49 is connected to the CPU 41. The image data output circuit 49 transmits the corrected multiple value picture image data stored in the corrected data storage area 44D over a cable 34 at a prescribed transfer rate.

An image memory device 51 is connected to the CPU 41. The multiple value image input device in the preferred embodiment stores image data for one page of the original sheet, determined the maximum and the minimum values of the picture image data, using the stored picture image data, and correct the read picture image data. The image memory device 51 stores the image data during the maximum and minimum determining and correcting operation. Because of image memory device 51, prescanning the original sheet is not necessary.

A DMA 52 is connected to the CPU 41. The DMA 52 circuit directly controls the writing to and reading from the image memory device 51 without burdening the CPU 41.

Figure 3:
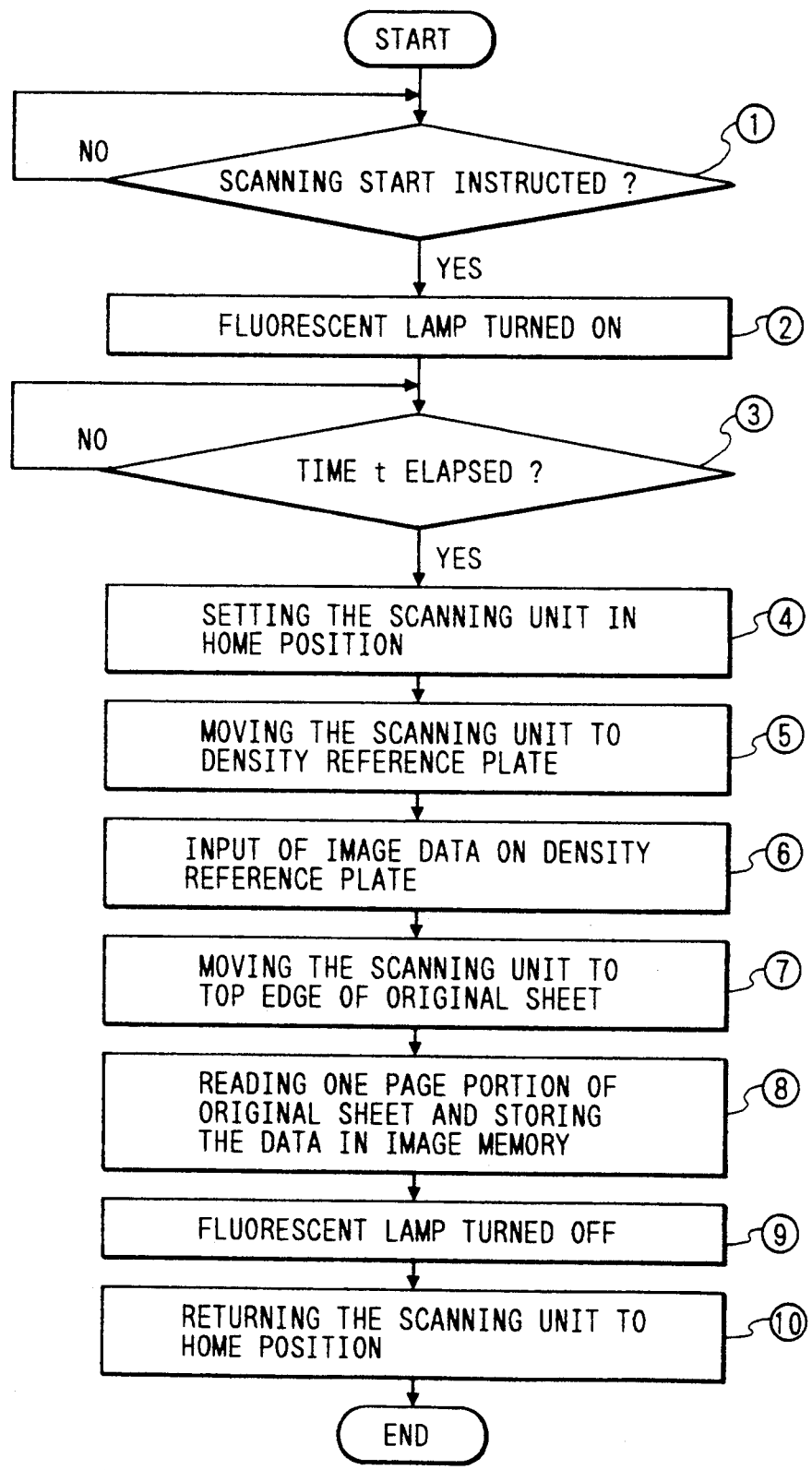
FIG. 3 is a flow chart showing a method of reading an original sheet.

FIG. 3 is a flow chart illustrating the method of reading the original sheet with the multiple value image input device according to the first preferred embodiment.

In step 1, an instruction is issued for the start of a scanning operation. In step 2, the CPU 41 shown in FIG. 1 turns on the fluorescent lamp 28 by directing the lamp control circuit 48. The fluorescent lamp 28 needs a period of time t, approximately two to five seconds, to obtain a stable light state, and the CPU 41 measures the time t. Upon the elapse of time t, step 3 indicates a "yes" and the CPU 41 sets the scanner 24 to a home position. In the ordinary course of operation, the scanner 24 is moved to the home position after the original sheet is scanned. However, if the power source is turned off or a power failure occurs during scanning, the scanner 24 may be stopped at a point other than the home position. Hence, a sensor detects whether the scanner 24 is in its home position.

In step 5, after the scanner 24 is set in the home position, the CPU 41 directs the motor control circuit 47 to move the scanning unit 24 to a position under the reference plate 26. In step 6, the multiple value image input device reads data for one scanning line, and stores the data in the actually measured value storage area 44A as the actually measured value of the density reference plate 26. Then, in step 7, the CPU 41 moves the scanner 24 to a start position at the top edge of the original sheet 22. From this position, in step 8, the scanner 24 reads the picture images at a prescribed degree of resolution. The data from the line by line read operation is stored in consecutive order in the image memory device 51 after the data is converted into chromatic grades at 64 levels. After one page of the original sheet 22 has been read, the CPU 41, in step 9, turns off the fluorescent lamp 28. In step 10, the CPU 41 directs the motor control circuit 47 to return the scanner 24 to the home position. The image data input in now complete (END).

In the preferred embodiments of the invention, two correction processes, a first stage and a second stage, are performed, FIG. 4 illustrates the first stage correction of the signal levels of the individual pixels using a density reference plate.

Figure 4A:
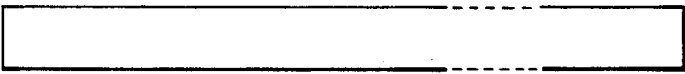
FIGS. 4(a)-(c) are charts illustrating a method of correcting the signal levels of the individual pixels in the one-dimensional image sensor using a density reference plate.
Figure 4B:
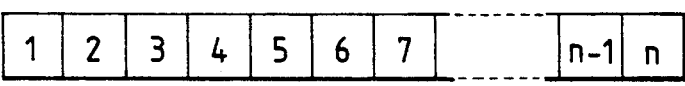

FIG. 4(a) illustrates the density reference plate 26. The white color plate 26 is read by the one-dimensional image sensor 29 shown in FIG. 4(b). The one-dimensional image sensor 29 is composed of n-pieces of pixel detectors numbered from "1" to "n", each of which reads picture images.

The multiple value image input device according to the preferred embodiment expresses the chromatic gradation in 64 gradation levels from "0" to "63" in terms of the signal levels.

Figure 4C:
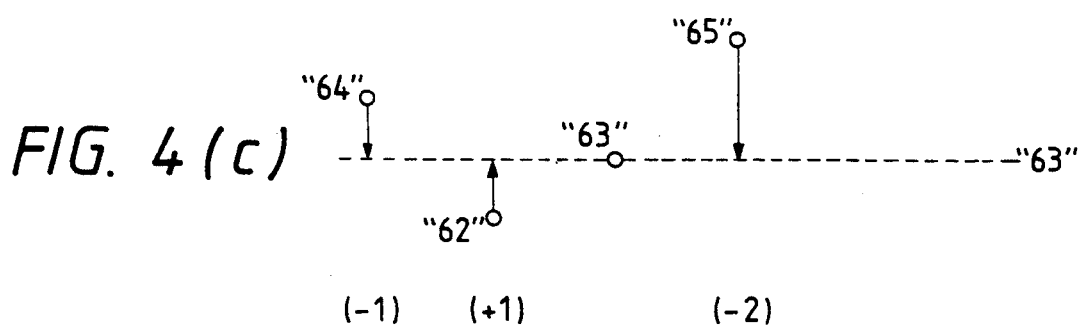

FIG. 4(c) presents the values actually read from the density reference plate 26 by the first, third, fifth, and seventh pixel detectors. The amount of correction, with respect to the four pixels, is shown in FIG. 4(c). The gradation level of each pixel from the density reference plate 26 is corrected to a constant value. Preferably the constant value is "63" on the "64" gradation level scale.

Because the signal level of the first pixel is "64", one level greater than the constant value, all future values read by the first pixel detector will be reduced by "1".

Because the signal level of the third pixel is "62", one level less than the constant value, all future values read by the third pixel detector will be increased by "1". Because the signal level of the fifth pixel is "63", the constant value, correction of the white level for the values read by the fifth pixel detector are not made. Because the signal level of the seventh pixel is a "65", all future values read by the seventh pixel detector will be reduced by "2". The corrections to the individual pixels are stored in the first-stage correction amount storage area 44B in the RAM 44.

Each pixel of picture image data read by the one-dimensional image sensor 29 in step 8 is corrected by the amount of correction stored in the first-stage correction amount storage area 44B, and the corrected values are written to the image memory device 51.

To prepare the data for the second stage correction, the signal levels of the corrected picture image data are checked, and the maximum and minimum signal levels for the entire original sheet are obtained. The maximum and the minimum values are stored in the maximum and minimum value storage area 44C in the RAM 44. The maximum and minimum values may also be detected subsequent to the completion of the storage of the picture image data in the image memory device 51.

Figure 5:
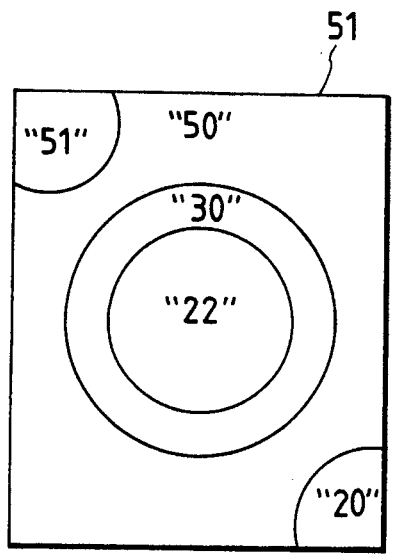
FIG. 5 illustrates an example of picture image data stored in the image memory device.

FIG. 5 illustrates picture image data for an original sheet stored in the image memory device. In this example, a graphic figure composed of signals having levels of "20", "22", "30", "50" and "51" is stored in the image memory device immediately after the first-stage correction. The maximum gradation level for the graphic figure in this example is "51", while the minimum gradation level is "20". Thus, the difference or range in chromatic gradation in this case is 31 levels.

Figure 6:
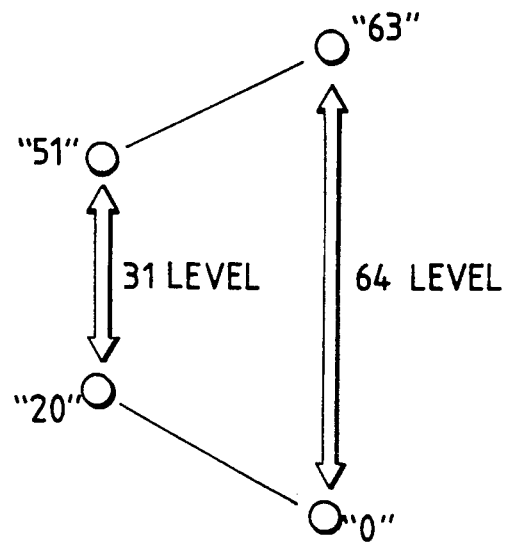
FIG. 6 illustrates a method for correcting the signal levels shown in FIG. 5.

FIG. 6 illustrates the second-stage correction. In the second stage correction, the image pixels are assigned new signal levels to use the entire available range of chromatic gradation. The pixels having a signal level "20", which is the minimum value in this example, are corrected to the signal level "0" the minimum gradation level. The pixels having a signal level "51", the maximum value in this example, are corrected to the signal level "63" the maximum gradation level.

The relationship between corrected and uncorrected values is expressed in equation (1), wherein the signal level before correction is "X" and the signal level after correction is "Y":

$$Y = \frac{X - \text{(minimum value)}}{\text{(maximum value} - \text{minimum value)}} \times \text{(level difference)} \quad (1)$$

$$= \frac{X - 20}{51 - 20} \times 63$$

When the remaining uncorrected signal levels shown in FIG. 5 are substituted into equation (1), the corrected signal levels $Y_{22}$, and $Y_{30}$, and $Y_{50}$ are:

$$Y_{22} = \frac{22 - 20}{51 - 20} \times 63 \simeq 4$$

$$Y_{30} = \frac{30 - 20}{51 - 20} \times 63 \simeq 20$$

$$Y_{50} = \frac{50 - 20}{51 - 20} \times 63 \simeq 61$$

Thus, new gradation levels are linearly interpolated for all of the signal levels.

Figure 7:
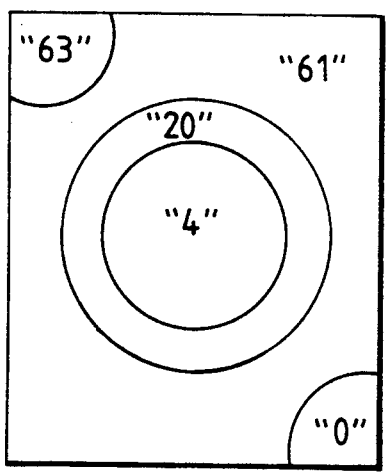
FIG. 7 illustrates the state of the picture image data on the original sheet shown in FIG. 5 corrected by the correcting operation shown in FIG. 6.

FIG. 7 shows the state of the picture image data on the original sheet presented in FIG. 5 corrected by the second-stage correction. A comparison of FIG. 7 with FIG. 5 reveals that the density differences among the various areas are expressed more distinctly.

Thus, in the second stage of correction, the image gradation levels are changed to utilize the full range of chromatic gradations to express the image. Therefore, distinct density differences are achieved.

In the first preferred embodiment described above, the image memory device 51 stores a unit of picture image data for one page of the original sheet. In a second preferred embodiment of the invention, the maximum value and minimum value of the picture image data on the original sheet can be found by prescanning without using a memory device.

Figure 8:
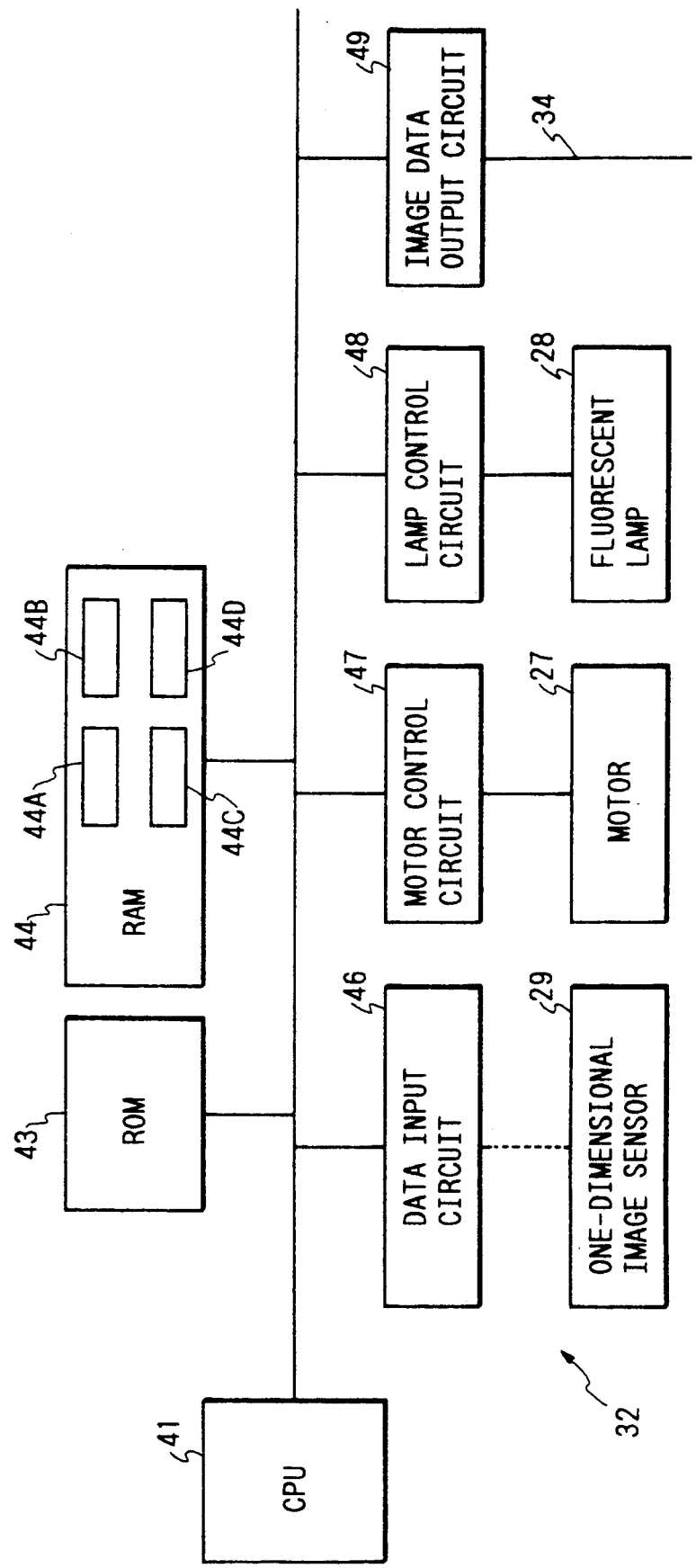
FIG. 8 is a block diagram illustrating a circuit construction of a second preferred embodiment of the multiple value image input device according to the present invention.

FIG. 8 illustrates a circuit for the multiple value image input device according to the second preferred embodiment. The original sheet is prescanned by the scanner 24. Neither an image memory device nor an DMA for independently controlling an image memory device is needed.

Figure 9:
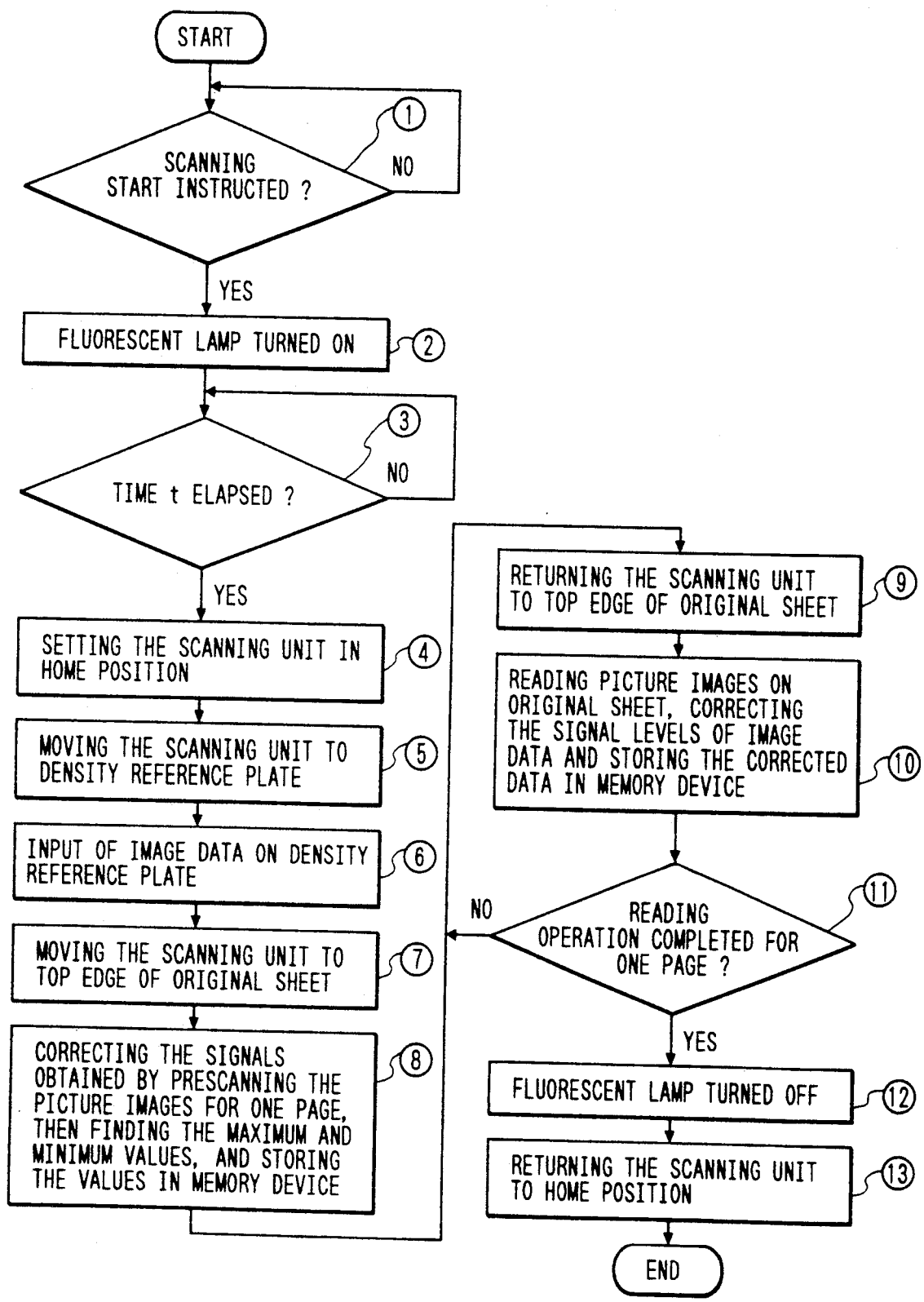
FIG. 9 is a flow chart illustrating a method of reading an original sheet according to the modification shown in FIG. 8.

FIG. 9 illustrates the method of reading the original sheet according to the second preferred embodiment of the invention.

In step 1, an instruction is issued for the start of a scanning operation. In step 2 the CPU 41, shown in FIG. 1, turns on the fluorescent lamp 28 by directing the lamp control circuit 48. The fluorescent lamp 28 needs a period of time t, approximately two to five seconds, to obtain a stable light state. The CPU 41 measures the time in step 3, and upon the elapse time t indicates a yes. The CPU 41 then returns the scanner 24 to the home position in step 4.

In step 5, the scanner 24 is moved into a position under the density reference place 26. The CPU 41 directs the movement through the motor control circuit 47. In step 6, the multiple value image input device reads data on one line and stores the data as the actually measured values of the density reference plate 26 in the actually measured value storage area 44A. In step 7, the CPU 41 moves the scanner 24 to a start position for scanning the original sheet 22. The scanner 24 prescans the original sheet 22. Assuming the resolution for the normal reading operation is 100 dpi (dots per inch), for example, the resolution for prescanning can be set at a scanning density as low as 100 dpi.

Current maximum and minimum values are retained by the image input device. The prescanning bit serial data from the original sheet 22 is compared in regular sequence with the current maximum and minimum values. The current maximum and minimum values are updated as new maximum and minimum values are discovered in the prescan data. When the prescanning operation for one page is completed, in step 8, the maximum and minimum value storage area 44C in the RAM 44 stores the maximum value and the minimum value reflecting the result of the first-stage correction.

After the original sheet 22 has been prescanned, the CPU 41, in step 9, directs the motor control circuit 47 to move the one-dimensional image sensor 29 to a position just under the original sheet 22. In step 10, the one-dimensional image sensor 29 starts the normal scanning operation on the original sheet 22. The image signals are processed for the second-stage correction in the same manner as described in the first preferred embodiment. The corrected image data is stored in the corrected data storage area 44D, and the data is output in regular sequence from the image data output circuit 49.

The operation is repeated in step 11 until one page of the original sheet 22 is read. After one page of the original sheet 22 is read, a "yes" is indicated, and the CPU 41, in step 12, turns off the fluorescent lamp 28, and, in step 13, directs the motor control unit 47 to return the scanner 24 to the home position. Thus, the CPU 41 completes all the control operations (END).

While the first and second preferred embodiments find the maximum and minimum values of the signal levels for the entire area of the original sheet, the present invention is not limited to the process described above. In a third preferred embodiment of the invention, the maximum and minimum values of a unit of picture image data for one line is found, and the chromatic gradation for each line is corrected on the basis of the line unit of data. The construction of the multiple value image input device according to the third preferred embodiment may be the same as the construction of the device illustrated in FIG. 8.

Figure 10:
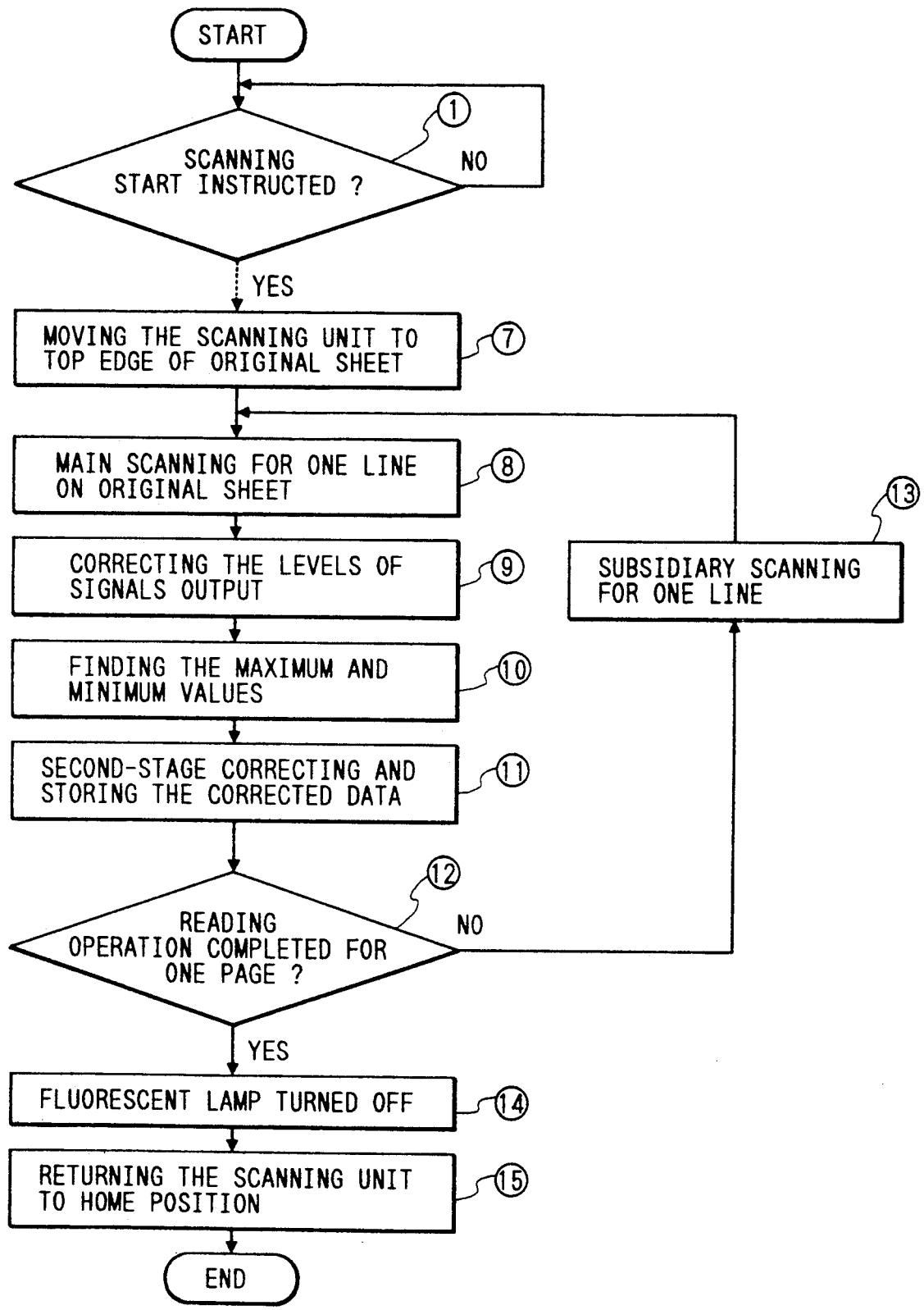
FIG. 10 is a flow chart illustrating the operation of reading an original sheet according to a third preferred embodiment of the invention.

FIG. 10 illustrates a method for reading the original sheet according to the third preferred embodiment of the invention. The operations from step 1 through step 7 shown in FIG. 10 are the same as those shown in FIG. 3 and FIG. 9. Steps 2-6 are omitted from illustration in FIG. 9. Step 7 and the subsequent steps are described below.

In step 7, the CPU 41 moves the scanner 24 to the top edge of the original sheet 22. In step 8, the one-dimensional image sensor 29 reads one line of the original sheet 22. The image data for the one line unit is converted into signal levels with 64 chromatic gradation levels by an analog-digital conversion process, and, in step 9, the first-stage correction is made of the picture image data on the basis of the actually measured values found on the density reference plate 26. In step 10, the CPU 41 finds the maximum and minimum values from the corrected data for one line, and stores the maximum and minimum values in the maximum and minimum value storage area 44C. Then, taking the maximum and minimum values as the bases, the CPU 41 performs the second-stage correction on the data for the one line. In step 11, the corrected picture image data is stored in the corrected data storage area 44D and then output in regular sequence from the image data output circuit 49.

After the corrected picture image data is stored in the corrected data storage area 44D, the CPU 41, in step 12, checks whether the reading operation is completed on one line of the original sheet 22. If the CPU 41 determines that the reading operation has not been completed, a "no" is indicated, and the CPU 41, in step 13, directs the motor control circuit 47 to move the scanner 24 in a subsidiary motion over one line to the next position for the reading operation. Then, the CPU 41 executes steps 8 through 12.

When the reading of the original sheet 22 is completed for one page a "yes" is indicates in step 12, and in step 14, the CPU 41 turns off the fluorescent lamp 28. In step 15, the CPU 41 directs the motor control unit 47, to return the scanner 24 to home position. Thus, the CPU 41 completes all the control operations (END).

Fluctuations in density among the individual lines of an original sheet with a non-uniform density distribution may appear when practicing the invention according to the third embodiment.

Figure 11:
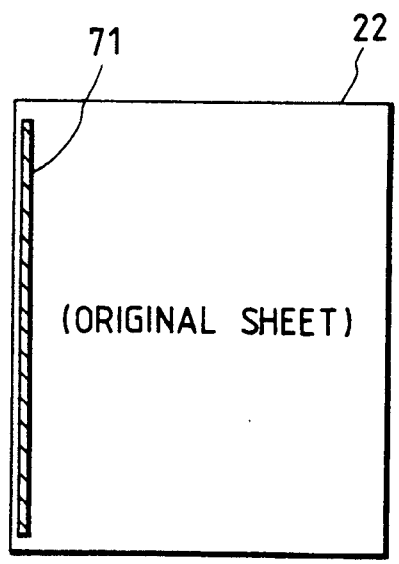
FIG. 11 is a plane view illustrating an original sheet processed by marking for artificially setting the maximum value and the minimum value according to the operation shown in FIG. 10.

Referring to FIG. 11, a solution to the density fluctuation problem will be discussed. The maximum and minimum values are artificially set. Marks 71 are applied in the prescribed density with a pen or the like in the subsidiary scanning direction on a side part of the reading area on the original sheet or in a position slightly off the reading area. The marks 71 may be applied in two colors for determining the set maximum value and the set minimum value, or may be in one color for defining one of these values.

In the preferred embodiments, the first-stage correction is made using a density reference plate in a single color, white. It is feasible to perform the first-stage correction using two or more colors (namely, degrees of density). For example, if the first-stage correction is made with two colors, preferably black and white, it is possible to correct a dispersion in the varying degrees of density (namely, the dynamic ranges) which the individual pixels express. If the first-stage correction is performed using three or more colors, such as white, gray, and black, then the number of chromatic grades which can be expressed is increased, and the individual pixels are expressed with a higher degree of accuracy.

In the above examples, 64 chromatic grades have been used to express the image, on the basis of a signal level with 64 stages, but the present invention can be practiced with 64 chromatic grades on the basis of a signal level with 256 stages. The number of chromatic grades expressed is also not restricted to 64 stages.

In the preferred embodiments, the maximum and minimum values are set in correspondence respectively with the maximum chromatic grade and the minimum chromatic grade available. However, if the contrast is excessively sharp the range of the expressed corrected chromatic grades may be set narrower as appropriate.

The preferred embodiments of the present invention propose a multiple value image input device designed to store the picture images of the original sheet once in the image memory device. The multiple value image input device is capable of not only performing the operations for reading the original sheet promptly, but also rendering the chromatic grades of the picture images in a manner appropriate for each particular original sheet by changing the signal levels corresponding to the maximum value and the minimum value when the results of corrections made of the chromatic grades are not desirable.

According to the preferred embodiments of the present invention, the multiple value image input device does not need an image memory device for storing the picture image data for one page of the original sheet, reducing the cost of the multiple value image input device.

According to the preferred embodiments of the present invention, the multiple value image input device performs the corrects picture images by line units. The multiple value image input device is capable of emphasizing the picture images without being influenced by noises. Even white dots or black dots which work as noise components will not influence the picture image. The preferred embodiment of the present invention produce a device at a low cost while securing high-speed performance in reading operations since the first preferred embodiment does not need to perform prescanning on the original sheet, and the second preferred embodiment does not require an image memory device.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto, and their equivalents.

What is claimed is:

1. A method for correcting image data represented by image pixels expressed in gradation levels, comprising the steps of:
   dividing the image data into at least two units of data, the at least two units of data being comprised of image pixels, and the at least two units of data each having a maximum gradation level and a minimum gradation level;
   detecting the maximum gradation level and the minimum gradation level in each unit of data; and
   assigning a new gradation level to at least one pixel in one of the units of data, the new gradation level being outside the range between the detected maximum gradation level and the detected minimum gradation level for the one unit of data.

2. A method for correcting image data as claimed in claim 1, wherein the step of dividing the image data comprises the sub steps of:
   providing a memory device;
   storing a set amount of data in the memory device; and
   defining the set amount of data as a unit of data.

3. A method for correcting image data as claimed in claim 2, wherein the image data is from an original document and the set amount of data is a page of the original document.

4. A method for correcting image data as claimed in claim 2, wherein the image data is from an original document and the set amount of data is one line of the original document.

5. A method for correcting image data as claim in claim 1, further comprising the step of presetting an artificial maximum value and an artificial minimum value for the new gradation level.

6. A method for correcting image data represented by image pixels expressed in gradation levels, comprising the steps of:
   dividing the image data into at least one unit of data, the one unit of data being comprised of image pixels, and the one unit of data having a maximum gradation level and a minimum gradation level;
   detecting the maximum gradation level and the minimum gradation level in the one unit of data; and
   assigning a new gradation level to at least one pixel in the one unit of data, the new gradation level being outside the range between the detected maximum gradation level and the detected minimum gradation level for the one unit of data;
   wherein the image data is from an original document and the step of detecting the maximum gradation level and the minimum gradation level comprises the sub steps of:
   scanning the original document;
   detecting the gradation levels within the unit of data of the scanned document;
   noting a current maximum gradation level and a current minimum gradation level among the detected gradation levels;
   replacing the current maximum gradation level with a new current maximum gradation level, the new current maximum gradation level being higher than the current maximum gradation level; and
   replacing the current minimum gradation level with a new current minimum gradation level, the new current minimum gradation level being lower than the current minimum gradation level.

7. A method for correcting image data as claimed in claim 6, further comprising the step of presetting an artificial maximum value and an artificial minimum value for the new gradation level.

8. A method for correcting image data as claimed in claim 6, wherein the step of dividing the image data comprises the sub steps of:
   providing a memory device;
   storing a set amount of data in the memory device; and
   defining the set amount of data as a unit of data.

9. A method for correcting image data as claimed in claim 8, wherein the image data is from an original document and the set amount of data is all of the image data from the document.

10. A method for correcting image data as claimed in claim 8, wherein the image data is from an original document and the set amount of data is a page of the original document.

11. A method for correcting image data as claimed in claim 8, wherein the image data is from an original document and the set amount of data is one line of the original document.

12. A method for correcting image data represented by image pixels expressed in gradation levels, comprising the steps of: dividing the image data into at least two units of data, the at least two units of data comprised of image pixels, and the at least two units of data each having a maximum gradation level and a minimum gradation level;
   detecting the maximum gradation level and the minimum gradation level in each unit of data; and
   calculating a new gradation level for each pixel in one of the units of data, the step of calculating comprising the sub steps of:
   assigning each pixel with the maximum gradation level a new gradation level higher than the maximum gradation level;
   assigning each pixel with the minimum gradation level a new gradation level lower than the minimum gradation level; and
   performing an interpolation to assign each pixel having a gradation level other than the maximum gradation level and the minimum gradation level a new gradation level between the new gradation level assigned to the pixels having the maximum gradation level and the new gradation level assigned to the pixels having the minimum gradation level.

13. A method for correcting image data as claimed in claim 12, wherein the interpolation is a linear interpolation.

14. A method for correcting image data as claimed in claim 13, wherein the step of dividing the image data comprises the sub steps of:
   providing a memory device;

storing a set amount of data in the memory device; and defining the set amount of data as a unit of data.

15. A method for correcting image data as claimed in claim 14, wherein the image data is from an original document and the set amount of data is a page of the original document.

16. A method for correcting image data as claimed in claim 14, wherein the image data is from an original document and the set amount of data is one line of the original document.

17. A method for correcting image data as claimed in claim 13, wherein the image data is from an original document and the step of detecting the maximum gradation level and the minimum gradation level comprises the sub steps of:

scanning the original document;

detecting the gradation levels within the unit of data from the original document;

noting a current maximum gradation level and a current minimum gradation level among detected gradation levels;

replacing the current maximum gradation level with a new current maximum gradation level, the new current maximum gradation level being higher than the current maximum gradation level; and replacing the current minimum gradation level with a new current minimum gradation level, the new current minimum gradation level being lower than the current minimum gradation level.

18. A device for correcting image data represented by image pixels expressed in gradation levels, comprising:

dividing means for dividing the image data into at least two units of data, the at least two units of data comprised of image pixels, and the at least two units of data each having a maximum gradation level and a minimum gradation level;

detecting means for detecting the maximum gradation level and the minimum gradation level in each unit of data; and assigning means for assigning a new gradation level to at least one pixel in one of the units of data, the new gradation level being outside the range between the maximum gradation level detected by the detecting means and the minimum gradation level detected by the detecting means.

19. A device for correcting image data as claimed in claim 18, wherein the dividing means comprises a memory device for storing a set amount of data, the set amount of data defining a unit of data.

20. A device for correcting image data as claimed in claim 19, wherein the image data is from an original document and the set amount of data is a page of the original document.

21. A device for correcting image data as claimed in claim 19, wherein the image data is from an original document and the set amount of data is one line of the original document.

22. A device for correcting image data as claimed in claim 18, wherein the image data is from an original document and the detecting means comprises:

scanning means for scanning the original document and detecting the gradation levels within the unit of data;

noting means for noting a current maximum gradation level and a current minimum gradation level among the gradation levels detected by the scanning means;

first replacing means for replacing the current maximum gradation level with a new current maximum gradation level, the new current maximum gradation level being higher than the current maximum gradation level; and second replacing means for replacing the current minimum gradation level with a new current minimum gradation level, the new current minimum gradation level being lower than the current minimum gradation level.

23. A device for correcting image data as claimed in claim 22, wherein an artificial maximum value and an artificial minimum value for the new gradation level are preset.

* * * * *